United States Patent Office 3,215,923
Patented Nov. 2, 1965

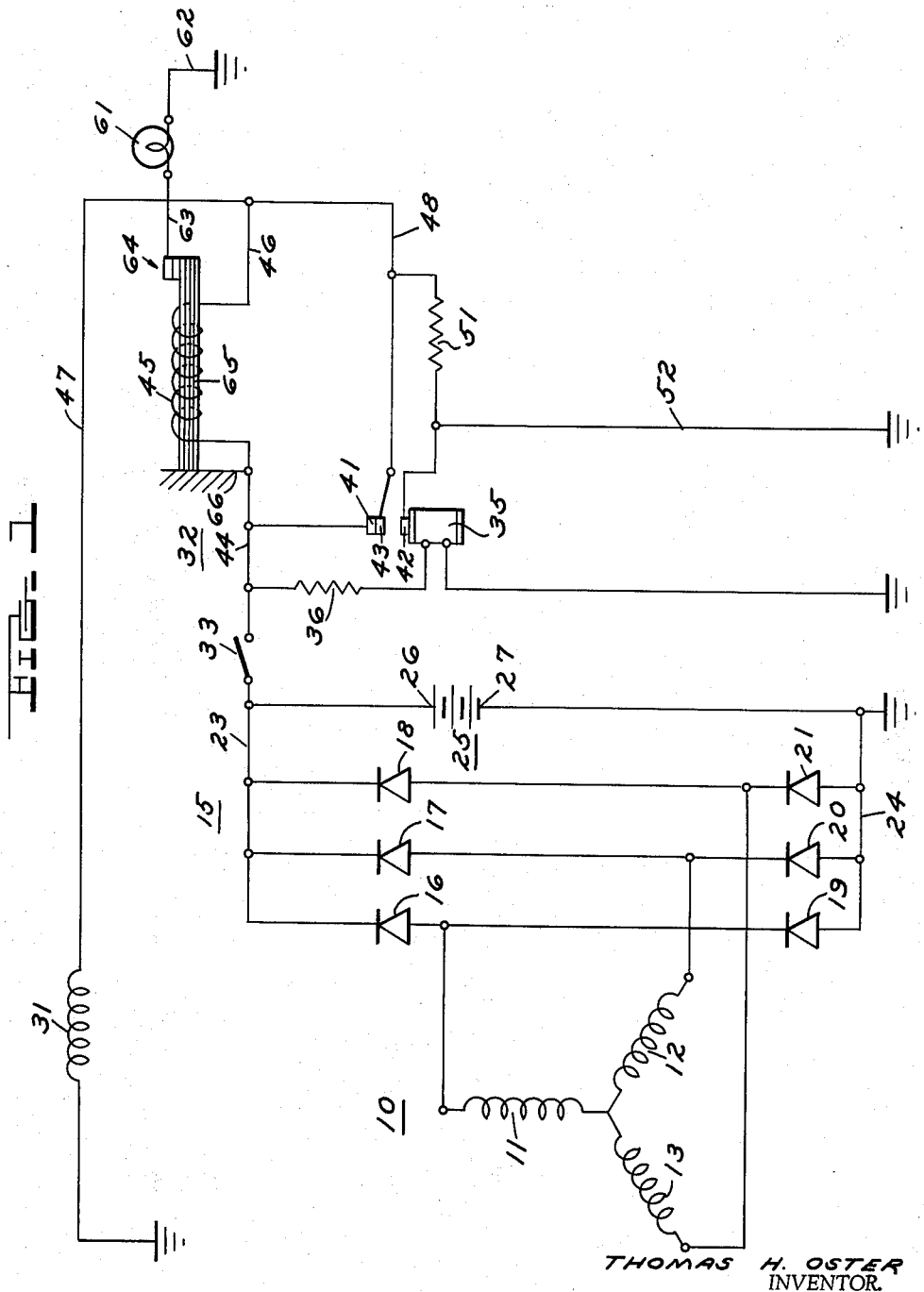

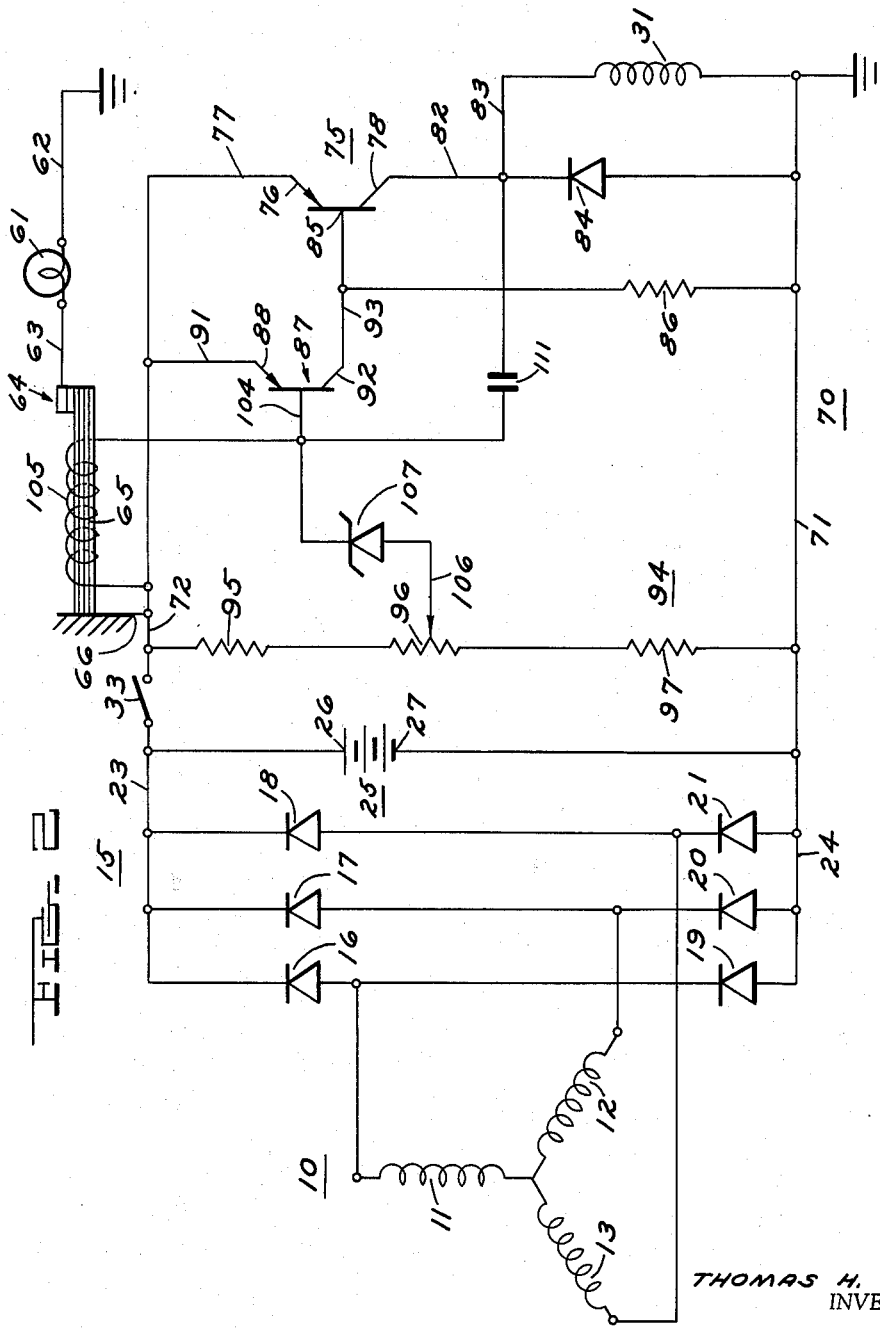

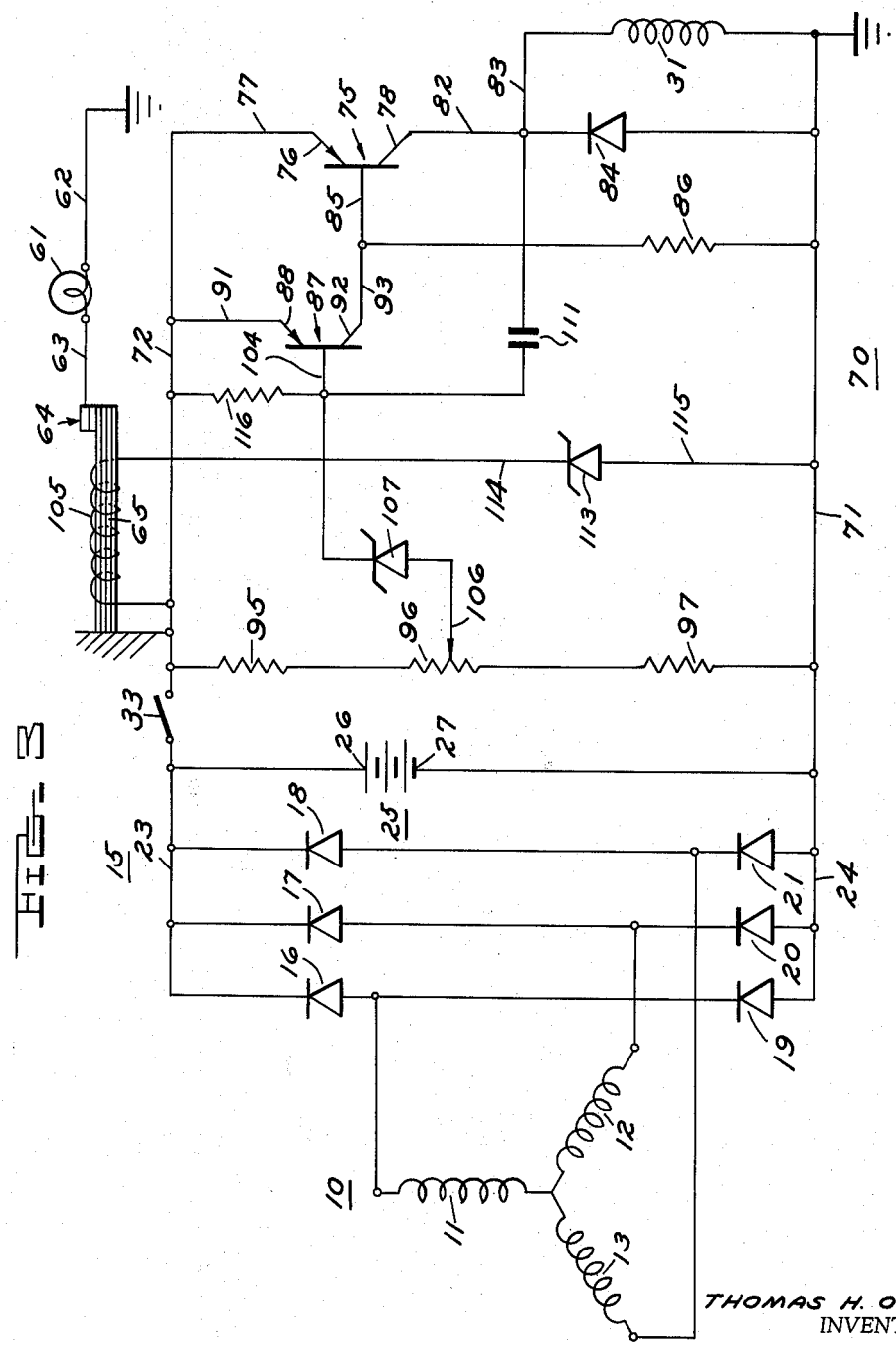

3,215,923
WARNING SIGNAL CIRCUIT FOR AN ALTERNATOR
Thomas H. Oster, Dearborn, Mich., assignor to Ford Motor Company, Dearborn, Mich., a corporation of Delaware
Filed Dec. 7, 1961, Ser. No. 157,794
7 Claims. (Cl. 320—48)

This invention relates to an automotive electrical generating system employing an alternator and more particularly to means employed with the alternator to give a warning signal when the alternator is not producing sufficient output voltage to charge the storage battery of the vehicle.

In conventional automotive vehicle electrical generating systems, a direct current generator is employed to charge the vehicle storage battery and to provide electrical energy for the other electrical loads of the vehicle. In such a system it is necessary to employ a cutout relay to prevent current from flowing from the storage battery through the generator when the output voltage of the generator is below the terminal voltage of the battery. This same system employs a warning light operated by the cutout relay to provide an indication or warning when the output voltage of the alternator falls below the terminal voltage of the battery.

In this invention, an alternator is employed as the generator of electrical energy, and a rectifier composed of a plurality of diodes is employed to rectify the alternating current output. The diodes have a reverse resistance sufficiently high to prevent current flow from the battery to the alternator when the voltage output of the alternator is below the terminal voltage of the battery. As a result, a need no longer exists for a cutout relay, and a new warning device operating means must be provided. It is believed that the applicant has developed a new, useful and unobvious means for operating such a warning device.

In most control circuits for limiting the output of an electrical generator or alternator there is a resistor that is energized at least periodically when the output voltage of the generator or alternator exceeds the terminal voltage of the battery by a preselected amount. The present invention provides a means responsive to the heat generated by this resistor for deenergizing a warning device, preferably a warning lamp, when output voltage of the alternator exceeds the terminal voltage of the battery by this preselected amount. This means preferably takes the form of a normally closed bimetal switch positioned in series with the alternator warning lamp. This series circuit is energized from the battery when the output voltage of the alternator is below the terminal voltage of the battery thereby causing the warning lamp to glow. When the output voltage of the alternator exceeds the terminal voltage of the battery by a preselected amount, the resistor will be energized and the heat generated by it will open the bimetal switch thereby deenergizing the warning lamp. The resistor employed for heating the bimetal switch need not be part of the control circuit mentioned above. In one embodiment of the invention there is provided a resistor connected in series with a zener diode. This series combination is connected across the output terminals of the alternator and the zener diode is poled to prevent current flow through the resistor when the output voltage of the alternator is below the terminal voltage of the battery. When the output voltage of the alternator exceeds the terminal voltage of the battery the zener diode breaks down and the resistor is energized.

This invention has another significant advantage over conventional circuits employed to operate warning devices or lamps. In conventional systems the warning lamp quite frequently will flicker when the output voltage of the generator hovers and momentarily falls below that value at which the warning lamp is designed to be extinguished. The bimetal switch means of the present invention has the ability to store a certain amount of thermal energy and will not reenergize the warning lamp if the output voltage of the alternator momentarily falls below the value at which the lamp is designed to be extinguished.

An object of the invention is the provision of a heat actuated means responsive to the output voltage of an alternator for indicating a condition in which the output voltage of the alternator is below a preselected value.

Another object of the invention is the provision of an alternator warning lamp for an automotive vehicle in which the lamp is extinguished by means responsive to heat developed by a resistor that is energized when the output voltage of the alternator exceeds the terminal voltage of the battery by a preselected value.

Another object of the invention is the provision of an uncomplicated and inexpensive warning lamp circuit for an alternator.

A further object of the invention is the provision of a warning lamp circuit for an automotive vehicle alternator system that will eliminate the flickering of the warning lamp commonly encountered in conventional systems.

Other objects and attendant advantages of the present invention will become more fully apparent as the specification is considered in connection with the attached drawings in which:

FIGURE 1 is a circuit diagram of one embodiment of the invention;

FIGURE 2 is a circuit diagram of another embodiment of the invention; and,

FIGURE 3 is a circuit diagram of still another embodiment of the invention.

Referring now to the drawings in which like reference numerals designate like parts throughout the several views thereof, there is shown in FIGURE 1 one embodiment of the invention. In this embodiment, a Y connected alternator, generally designated by the numeral 10, has a plurality of output windings 11, 12 and 13. Although a Y connected alternator has been shown it will be apparent to those skilled in the art that a delta connected alternator could also be used. The output windings are connected to a rectifier 15, comprised of a plurality of diodes 16, 17, 18, 19, 20 and 21 of the kind having a high back resistance, preferably silicon diodes. The output terminals of the rectifier, designated by the numerals 23 and 24, are connected to the terminals of a storage battery 25. The output terminal 23 is connected to the positive terminal 26 of the storage battery and the output terminal 24 of the rectifier is connected to the negative terminal 27 of the storage battery. The diodes 16, 17, 18, 19, 20 and 21 of the rectifier have a sufficiently high reverse resistance to prevent current flow from the battery 25 to the alternator windings 11, 12 and 13 when the output voltage of the alternator is below the terminal voltage of the battery.

The field winding 31 of the alternator 10 is connected to the output terminal 23 of the rectifier and to the positive terminal 26 of storage battery 25 through a conventional double contact voltage limiter, generally designated by the numeral 32, and through an ignition switch designated by the numeral 33. The voltage limiter 32 includes a relay winding 35 and a resistor 36 connected in series across the terminals of the rectifier 15 and the electrical storage battery 25. The voltage limiter 32 also includes a first stationary contact 41, a second stationary contact 42, and a movable contact 43. The contacts 41 and 43 form a normally closed pair of contacts and are closed until such time as the alternator 10 produces an output voltage that exceeds the terminal voltage of the battery 25 by a preselected amount.

As can readily be seen from the drawing, the contact 41 is connected to one terminal of the ignition switch 33 through a lead 44, and the field winding 31 is connected to the terminal 23 of the rectifier and to the positive terminal 26 of electrical storage battery 25, through the ignition switch 33, the lead 44, a resistor 45, a lead 46, and a lead 47. The movable contact 43 of the voltage limiter 32 is connected to lead 47 by a lead 48, while second stationary contact 42 is connected to lead 48 through a resistor 51 and is also connected to ground through a lead 52.

An alternator warning device, preferably a lamp 61, has one terminal connected to ground through a lead 62 and has the other terminal connected through a lead 63 to a pair of normally closed contacts 64. A means responsive to the heat generated by the resistor 45 for opening the normally closed contacts 64, preferably a bimetal switch including the normally closed contacts 64 and a bimetal strip 65, is connected to lead 44 and first stationary contact 41 by a lead 66. The bimetal strip 65 is positioned in heat exchange relationship with resistor 45, preferably by having the resistor wound around it, and it is anchored at the end adjacent the lead 66 and opposite the normally closed contacts 64.

In the operation of the alternator circuit shown in FIGURE 1, the ignition switch 33 is closed and the alternator field winding 31 is energized from the storage battery 25, through the ignition switch 33, through lead 44, normally closed contacts 41 and 43 and leads 48 and 47. At this time, the resistor 45 will be bypassed by the normally closed contacts 41 and 43 and leads 48 and 47. The normally closed contacts 64 will be closed, therefore, and warning lamp 61 will be energized from the battery, through the ignition switch 33, lead 44, lead 66, bimetal strip 65, normally closed contacts 64, and lead 63.

When the output voltage of the alternator exceeds the terminal voltage of the battery by a preselected amount, the current flowing through the voltage limiter relay winding 35 will cause the normally closed contacts 41 and 43 to open thereby inserting the resistor 45 in series with the field winding 31. This will reduce the current flowing through the field winding 31 and as a consequence the output of the output voltage of the alternator 10 and the current flowing through the relay winding 35 of the voltage limiter will be reduced. Hence, the contacts 41 and 43 will again close. This cycle may be repeated periodically at quite a rapid rate. The resistor 45 is energized periodically, therefore, when the output voltage of the alternator exceeds the terminal voltage of the battery 25 by a preselected amount. The heat generated by the resistor as it is energized periodically will act upon the bimetal strip 65 flexing it downwardly about its fixed end adjacent the lead 66. This will open normally closed contacts 64, thereby deenergizing the warning lamp 61. Thus, there is provided a means actuated by the heat of a resistor that is energized in response to a preselected alternator output voltage for extinguishing the alternator warning lamp when the output of the alternator exceeds the terminal voltage of battery 25 by a preselected value.

The warning lamp will remain extinguished should the output voltage of the alternator rise appreciably above this preselected value. In this case the current flowing through the relay winding 35 will be sufficient to prevent the contacts 41 and 43 from coming into engagement and will also be sufficient to alternately open and close a connection between the movable contact 43 and the second stationary contact 42. This alternately energizes field winding 31 through the resistor 45, and grounds the normally energized end of the field winding 31 through the ground lead 52. When the normally energized end of the field winding 31 is grounded the resistor 51 is connected across it. Thus, the warning lamp will remain extinguished since the resistor 45 remains energized at least periodically.

The thermal time constant of the bimetal switch means is made sufficiently high to prevent the contacts 64 from closing when the output voltage of the alternator momentarily falls below the preselected value at which the alternator warning lamp is designed to be extinguished. When the output voltage of the alternator momentarily falls below this value, the contacts 41 and 43 will close for a short period of time and the resistor 45 will be deenergized. The bimetal will start to cool and move the contacts 64 to the closed position, but they will not close until the thermal time constant of the switch has been exceeded. A bimetal switch may thus be provided that has a thermal time constant large enough to prevent the flickering of the warning lamp when the output voltage of the alternator momentarily falls below the preselected voltage at which the warning lamp is designed to be extinguished.

Another embodiment of the invention is shown in FIGURE 2. This embodiment of the invention employs the same components as the embodiment shown in FIGURE 1 except that a transistorized voltage limiter 70 is employed to control the current flowing through the field winding 31 and hence to limit the output voltage of the alternator.

The transistorized voltage limiter 70 includes a line 71 connected to the negative terminal 27 of the battery and to the terminal 24 of the rectifier 15. This line is grounded, as shown by the ground connection adjacent the alternator field winding 31. The voltage limiter 70 also includes another line 72 that is connected to the positive terminal 20 of the battery 25 and to terminal 26 of rectifier 15, through ignition switch 33. A power transistor 75 is provided having an emitter 76 connected to line 72 through a lead 77 and having a collector 78 connected to field winding 31 through leads 82 and 83. The collector 78 is also connected through lead 82 to a diode 84 which provides a return circuit for the reverse current induced in the field winding 31 when the field is deenergized. The power transistor 75 also includes a base 85 that is connected to line 71 through a resistor 86.

A second transistor, generally designated by the numeral 87, includes an emitter 88 connected to line 72 through a lead 91, and a collector 92 connected to the base 85 of power transistor 75 and to resistor 86 through a lead 93.

A variable voltage divider, generally designated by the numeral 94, is connected across the lines 71 and 72. This variable voltage divider network includes resistors 95, 96 and 97 connected in series. As can readily be appreciated by an inspection of FIGURE 2, this variable voltage divider is connected across the terminals of the rectifier 15 and across the terminals of the storage battery 25.

The base 104 of second transistor 87 is connected to line 72 through a resistor 105. The base 104 is also connected to an adjustable arm 106 of the variable voltage divider 94, through a zener diode 107. The zener diode 107 is poled to prevent conduction of the second transistor 87 until the breakdown voltage of the diode is reached. A capacitor 111 is connected between the base 104 of the second transistor 87, and the collector 78 of power transistor 75 to provide rapid bistable switching of the transistors.

The alternator warning lamp 61 is connected in this embodiment to the line 72, through lead 63, through the bimetal switch means that includes normally closed contacts 64 and the bimetal strip 65, and through the lead 66.

In the operation of this embodiment of the invention, the power transistor 75 is turned to its full "on" position when the ignition switch 33 is closed since the emitter 76 is connected to the positive terminal 26 of battery 25 and the base 85 is connected to the negative terminal 27 of battery 25 through the resistor 86. This supplies full field current to the field winding 31. At this time the zener diode 107 blocks current flow from the base of the second transistor 87, and it also blocks current flow from the line 72 through the resistor 105. This condition remains until the alternator 10 produces an output voltage at a preselected value above the terminal voltage of the battery 25. The adjustable arm 96 of the adjustable voltage divider network 94 is set to provide sufficient voltage at this time to break down the zener diode 107. This switches the second transistor 87 from the non-conducting state to the conducting state by permitting current flow from emitter 88 through base 104, through zener diode 107 and to ground through adjustable arm 106, resistor 96 and resistor 97. Since resistor 105 is connected to the base 104 and to the zener diode 107, current will also flow through this resistor from line 72 to ground through zener diode 107, adjustable arm 106 and resistors 96 and 97.

Bringing the second transistor 87 into a fully conducting state turns the power transistor 75 to a non-conducting state by raising the potential of the base 85 approximately to the potential of the line 72. Such an action, of course, reduces the flow of current through the field winding 31, and this decrease in current reduces the output voltage of the alternator. The potential across the line 71 and 72 may be lowered to the point where the zener diode 107 again blocks current flow from the base 104 of second transistor 87 and blocks current flow through resistor 105. The second transistor 87 will now be switched to its fully nonconducting state and power transistor 75 will be switched to its fully conducting state. The capacitor 111 insures rapid switching action of the transistors. This cycle may be repated at a rapid rate, but during this time the resistor 105 will be at least periodically energized and the heat thereof will bend bimetal strip 65 downwardly about its fixed end to open the normally closed contacts 64 and thereby break the circuit to the warning lamp 61. Thus, the warning lamp 61 will be energized when the output voltage of the alternator 10 is below a preselected value in excess of the terminal voltage of battery 25, and it will be extinguished when the output voltage is above this preselected value.

The embodiment of the invention shown in FIGURE 3 is similar to the embodiment shown in FIGURE 2, except that a second zener diode 113 is employed to control the energization of the resistor 105. This second zener diode 113 has one terminal connected to resistor 105 through a lead 114 and has the other terminal connected to line 71 through a lead 115. Another resistor 116 is employed to connect the base 104 of second transistor 87 to the line 72.

The circuit arrangement shown in FIGURE 3 permits the warning lamp 61 to be deenergized independently of the operation of the voltage limiter 70. The zener diode 113 should be selected to have a breakdown voltage slightly in excess of the unloaded terminal voltage of battery 25 so that the resistor 105 will be energized when the output voltage of the alternator reaches a voltage slightly in excess of the terminal voltage of the battery. This will in turn extinguish the warning lamp 61 when this voltage is obtained.

The embodiments shown in FIGURES 2 and 3 possess all of the advantages discussed with relation to the embodiment shown in FIGURE 1. The bimetal switches in these embodiments also have a sufficiently large thermal time constant to prevent flickering of the warning lamp when the output voltage of the alternator hovers near the voltage at which the warning lamp 61 is designed to be extinguished. It is to be noted that in all of the embodiments the heat actuated switch means is actuated in response to the output voltage of the alternator and that the heat actuated switch means extinguishes the warning lamp when the output voltage of the alternator reaches a preselected level that is at least equal to the terminal voltage of the battery.

The present invention thus provides an uncomplicated and inexpensive warning device system for an automotive vehicle alternator that preferably employs a heat actuated switch means responsive to alternator output voltage to extinguish a warning lamp.

It will be understood that the invention is not to be limited to the exact construction shown and described and that various changes and modifications may be made without departing from the spirit and scope of the invention, as defined in the appended claims.

I claim:

1. In an electrical generating system for an automotive vehicle the combination comprising, an alternator, a rectifier connected to rectify the output of said alternator, said rectifier having output terminals, a storage battery connected across the output terminals of said rectifier, said rectifier having a reverse resistance sufficiently high to prevent significant current flow from the battery to the alternator when the rectified output voltage of the alternator is below the terminal voltage of the battery, a warning lamp connected in circuit with said electrical storage battery, a normally closed heat responsive switch connected in series with said warning lamp, said heat responsive switch including heater means, a zener diode connected in series with said heater means, the series combination of said heater means and said zener diode being connected across the output terminals of said rectifier, said zener diode being poled to prevent current flow through said heater means when the output voltage of the alternator appearing at the rectifier output terminals is below a preselected value that is equal to or greater than the terminal voltage of said battery, said zener diode breaking down when the output voltage of the alternator exceeds said preselected value whereby said heater means is energized, and said normally closed heat responsive switch is opened and said warning lamp is extinguished.

2. In an electrical generating system for an automotive vehicle the combination comprising, an alternator including a field winding, a rectifier connected to rectify the output of said alternator, said rectifier having output terminals, a storage battery connected across the output terminals of said rectifier, said rectifier having a reverse resistance sufficiently high to prevent significant current flow from said battery to said alternator when the rectified output voltage of the alternator is below the terminal voltage of the battery, a warning lamp connected in circuit with said electrical storage battery, a normally closed heat responsive switch connected in series with said warning lamp and said storage battery, said heat responsive switch including heater means, a voltage limiter connected across the output terminals of said rectifier and to said field winding, said voltage limiter including means for connecting said heater means in series with said field winding when the output voltage of the alternator appearing at the terminals of said rectifier exceeds a preselected voltage value that is at least equal to the terminal voltage of the battery, the heat from said heater means opening said heat responsive switch whereby said warning lamp is extinguished.

3. In an automotive electrical generating system, the combination comprising an alternator having a field winding, a rectifier connected to rectify the output of said alternator, said rectifier having output terminals, an electrical storage battery connected across the output terminals of said rectifier, means connected to the output terminals of said rectifier for controlling the energization of said field winding in response to the alternator output, said means including a resistor that is energized at least periodically when the output voltage of the alternator appearing at said rectifier terminals exceeds the terminal voltage of said battery, a warning lamp connected in circuit with said electrical storage battery, and a heat responsive switch connected in circuit with said warning lamp and responsive to the heat developed by said resistor for opening the circuit between the said warning lamp and said storage battery when the output voltage of said alternator appearing at the terminals of said rectifier exceeds the terminal voltage of said battery.

4. In an automotive electrical generating system the combination comprising, an alternator including a rectifier, said rectifier comprising a plurality of silicon diodes, the output terminals of said rectifier comprising the output terminals of said alternator, an electrical storage battery connected across the output terminals of said alternator, said silicon diodes blocking current flow from said storage battery to said alternator when the output voltage of said alternator is below the terminal voltage of said battery, said alternator having a field winding, a voltage limiter connected to the output terminals of said alternator and to said field winding for controlling the energization of said field winding in response to the output voltage of said alternator, said voltage limiter including a resistor that is energized at least periodically when the output voltage of said alternator exceeds a preselected value that is at least equal to the terminal voltage of said electrical storage battery, an alternator warning lamp connected across said electrical storage battery, said alternator warning lamp being energized when the output voltage of said alternator is below said preselected value, and a bimetal switch connected in series with said alternator warning lamp and said electrical storage battery, said bimetal switch being positioned adjacent to and being adapted to open in response to the heat developed by said resistor whereby said alternator warning lamp is extinguished when the output voltage of said alternator exceeds said preselected value.

5. In an automotive electrical generating system the combination comprising, an alternator including a rectifier connected to rectify the output of said alternator, said rectifier including a plurality of silicon diodes and having output terminals, an electrical storage battery connected across the output terminals of said rectifier, said silicon diodes blocking the flow of current from said battery to said alternator when the output of said alternator is below the terminal voltage of said battery, said alernator including a field winding, a voltage limiter including a relay having a winding, a stationary contact and a movable contact, said contacts being normally closed, said stationary contact being connected to be energized by said battery and the output of said alternator, a resistor, said field winding being connected to said stationary contact, said battery and the output of said alternator through said resistor, said movable contact being directly connected to said field winding, the winding of said relay being connected across the terminals of said rectifier and across the terminals of said battery, said field winding being energized from said battery through said stationary contact and said movable contact when the output voltage of said alternator is below the terminal voltage of said battery, said relay winding opening said contacts at least periodically when the output of said alternator exceeds the terminal voltage of said battery by a preselected value whereby said field winding is energized at least periodically through said resistor, a warning lamp and a normally closed bimetal switch connected in series circuit, said series circuit being connected across the output terminals of said rectifier and across the terminals of said battery, said resistor being positioned in heat transferring relation to said bimetal switch whereby the heat developed by said resistor will open the series circuit and extinguish said alternator warning lamp when the output voltage of said alternator exceeds the terminal voltage of said battery by said preselected value.

6. In an electrical generating system for an automotive vehicle the combination comprising, an alternator, a rectifier comprised of a plurality of silicon diodes connected to rectify the output of said alternator, said rectifier including output terminals, said alternator including a field winding, an electrical storage battery connected across the output terminals of said rectifier, a voltage limiter connected across the output terminals of said rectifier and said battery, said voltage limiter including a transistor, means connected in circuit with said transistor and said alternator for increasing the current flow through said transistor when the output voltage of said alternator reaches a preselected value above the terminal voltage of said battery, a resistor connected in circuit with said transistor, current flow through said resistor increasing coincident with the increase in current through said transistor, a warning lamp and a normally closed bimetal switch connected in series circuit, said series circuit being connected to be energized by said electrical storage battery and the output of said alternator, said bimetal switch being positioned in heat transferring relation to said resistor whereby the heat from said resistor opens said bimetal switch and extinguishes said warning lamp when the output voltage of said alternator reaches said preselected value above the terminal voltage of said battery.

7. In an electrical generating system for an automotive vehicle the combination comprising, an alternator, a rectifier comprised of a plurality of silicon diodes connected to rectify the output of said alternator, said rectifier having output terminals, said alternator including a field winding, an electrical storage battery connected across the output terminals of said rectifier, a warning lamp and a normally closed bimetal switch connected in series circuit, said series circuit being connected across said electrical storage battery and the output terminals of said rectifier, a resistor and a zener diode connected in series across the output terminals of said rectifier, said zener diode being poled to prevent current flow through said resistor when the output voltage of said alternator appearing at the rectifier terminals is below a preselected value that is at least equal to the terminal voltage of said battery, said zener diode breaking down and permitting current flow through said resistor when the output voltage of said alternator appearing at said rectifier terminal exceeds said preselected value, said resistor being positioned in heat transferring relationship to said bimetal switch whereby the heat from said resistor opens said bimetal switch and extinguishes said warning lamp when the output voltage of said alternator reaches said preselected value.

References Cited by the Examiner
UNITED STATES PATENTS

| | | | |
|---|---|---|---|
| 2,908,854 | 10/59 | Rice | 320—48 X |
| 2,955,245 | 10/60 | Payne et al. | 320—35 |
| 3,022,456 | 2/62 | Larson et al. | 322—99 X |
| 3,076,127 | 1/63 | Grecu | 320—36 |

LLOYD McCOLLUM, *Primary Examiner.*